(12) United States Patent
Peri (10) Patent No.: US 10,378,871 B2
(45) Date of Patent: Aug. 13, 2019

(54) TAPE MEASURING DEVICE

(71) Applicant: M1 Enterprises, LLC, Haydenville, MA (US)

(72) Inventor: Oded Peri, Haydenville, MA (US)

(73) Assignee: MI Enterprises, LLC, Haydenville, MA (US)

( * ) Notice: Subject to any disclaimer, the term of this patent is extended or adjusted under 35 U.S.C. 154(b) by 126 days.

(21) Appl. No.: 15/581,423

(22) Filed: Apr. 28, 2017

(65) Prior Publication Data

US 2017/0314902 A1 Nov. 2, 2017

Related U.S. Application Data

(60) Provisional application No. 62/330,443, filed on May 2, 2016.

(51) Int. Cl.
*G01B 3/10* (2006.01)

(52) U.S. Cl.
CPC ......... *G01B 3/1084* (2013.01); *G01B 3/1056* (2013.01); *G01B 3/1061* (2013.01); *G01B 2003/1089* (2013.01)

(58) Field of Classification Search
CPC .. G01B 3/1084; G01B 3/1056; G01B 3/1061; G01B 2003/1089
USPC .................................. 33/579, 769, 770, 668
See application file for complete search history.

(56) References Cited

U.S. PATENT DOCUMENTS

| | | | |
|---|---|---|---|
| 3,100,941 A * | 8/1963 | Taylor | G01B 3/1071 33/668 |
| 3,526,964 A | 9/1970 | Clark, Jr. | |
| 3,577,641 A | 5/1971 | Smith | |
| 4,015,337 A * | 4/1977 | Taylor | B25H 7/04 33/27.03 |
| 4,439,927 A * | 4/1984 | Elliott | G01B 3/1005 33/668 |
| 4,603,481 A | 8/1986 | Cohen et al. | |
| 4,630,376 A * | 12/1986 | Pentecost | G01B 3/1084 33/668 |
| 4,760,648 A | 8/1988 | Doak et al. | |
| 4,890,392 A | 1/1990 | Komura et al. | |
| 4,965,941 A * | 10/1990 | Agostinacci | B25H 7/04 33/668 |
| 4,999,924 A | 3/1991 | Shields | |
| 5,189,801 A | 3/1993 | Nicely | |
| 5,367,785 A | 11/1994 | Benarroch | |
| 5,386,643 A | 2/1995 | Corcoran | |

(Continued)

*Primary Examiner* — Nimeshkumar D Patel
*Assistant Examiner* — Tania C Courson
(74) *Attorney, Agent, or Firm* — Doherty, Wallace, Pillsbury & Murphy, P.C.

(57) ABSTRACT

A tape measuring device comprising a mount which is integrally formed with or attached to a housing. A specially designed stop plate is disposed on the mount. The stop plate provides a means whereby the indicia located on a tape blade of the tape measuring device may be easily located and read. The stop plate further provides a means for the precise taking and replication of a measurement. The tape measuring device further comprises a marker plate. The marker plate comprises a scribe which can mark an object to be measured. The marker plate is pivotally attached to the mount to allow for the retraction of the scribe when the marker plate is not in use, and for expansion of the scribe when the marker plate is in use.

4 Claims, 10 Drawing Sheets

(56) References Cited

U.S. PATENT DOCUMENTS

| | | | | |
|---|---|---|---|---|
| 5,430,952 A * | | 7/1995 | Betts | G01B 3/1084 33/760 |
| 5,577,329 A * | | 11/1996 | States | G01B 3/1084 33/668 |
| 5,671,543 A | | 9/1997 | Sears | |
| 5,829,152 A * | | 11/1998 | Potter | B25H 7/04 33/668 |
| 5,983,514 A | | 11/1999 | Lindsey | |
| 6,115,931 A * | | 9/2000 | Arcand | B25H 7/04 33/668 |
| 6,223,443 B1 | | 5/2001 | Jacobs | |
| 6,405,451 B1 | | 6/2002 | Hsu | |
| 6,457,247 B1 | | 10/2002 | Lin | |
| 6,497,050 B1 * | | 12/2002 | Ricalde | B25H 7/04 33/668 |
| 6,513,261 B2 * | | 2/2003 | Johnson | G01B 3/1005 33/42 |
| 6,612,046 B1 * | | 9/2003 | Cimorell | B25H 7/04 33/668 |
| 6,701,636 B2 * | | 3/2004 | Scarborough | G01B 3/1041 33/42 |
| 6,898,866 B2 | | 5/2005 | Weeks | |
| 6,910,280 B2 | | 6/2005 | Scarborough | |
| 6,912,799 B1 * | | 7/2005 | Smith | B25H 7/04 33/27.031 |
| 6,928,029 B2 | | 8/2005 | Rickman | |
| 6,931,734 B2 * | | 8/2005 | Elder | G01B 3/1071 33/42 |
| 6,938,354 B2 * | | 9/2005 | Worthington | C07K 16/32 33/668 |
| 6,971,185 B2 | | 12/2005 | Scarborough | |
| 6,996,915 B2 * | | 2/2006 | Ricalde | B25H 7/04 33/27.03 |
| 7,040,035 B1 | | 5/2006 | Scarborough | |
| 7,065,895 B2 | | 6/2006 | Hoopengarner | |
| 7,086,174 B2 | | 8/2006 | Scarborough | |
| 7,159,332 B2 | | 1/2007 | Sullivan | |
| 7,162,805 B2 | | 1/2007 | Vick | |
| 7,222,437 B2 | | 5/2007 | Spanski et al. | |
| 7,228,644 B1 | | 6/2007 | Hellem et al. | |
| 7,260,898 B2 * | | 8/2007 | Snelson | B25F 1/00 33/668 |
| 7,260,899 B2 | | 8/2007 | Jones | |
| 7,263,785 B2 | | 9/2007 | Sullivan | |
| 7,269,913 B2 * | | 9/2007 | Holevas | G01B 3/1084 33/668 |
| 7,334,344 B2 | | 2/2008 | Scarborough | |
| 7,363,723 B1 | | 4/2008 | Peterson | |
| 7,900,370 B1 | | 3/2011 | Treige | |
| 8,127,461 B1 * | | 3/2012 | Peri | G01B 3/1061 33/760 |
| 9,557,151 B1 * | | 1/2017 | Sanchez | G01B 3/1084 |
| 2002/0153734 A1 | | 10/2002 | Schroeder | |
| 2003/0019116 A1 * | | 1/2003 | Dewall | G01B 3/1041 33/42 |
| 2003/0154617 A1 * | | 8/2003 | Ricalde | B25H 7/04 33/770 |
| 2004/0025364 A1 * | | 2/2004 | Elder | G01B 3/1071 33/770 |
| 2008/0072446 A1 | | 3/2008 | Hu | |
| 2008/0086903 A1 | | 4/2008 | Peterson | |
| 2012/0073152 A1 * | | 3/2012 | McGahan | B26B 29/06 33/32.3 |

\* cited by examiner

TAPE MEASURING DEVICE

BACKGROUND TO THE INVENTION

1. Field of the Invention

The present invention relates to measuring devices, and more particularly, to a device for measuring, reading, transferring, and marking a measurement to be marked on a piece of work or material.

2. Background of the Invention

Precision and efficiency are common problems in reading, recording, transferring and marking of measurements. Standard "pocket" or hand-held tape measures do not provide highly accurate sighting of the dimensions measured, do not retain the accurate measurement for transfer to another location or material piece of work, and do not include a tool to accurately scribe or mark the measurement immediately after transfer. Also, currently known tape measuring devices are susceptible to breakage and damage due to inferior construction and design.

SUMMARY OF THE INVENTION

The above-mentioned problems of the prior art are overcome or eliminated by a measuring and marking device for use in the precise taking, reading, replicating, and marking of a measurement with a tape measure.

The tape measuring device includes an indicator and marking assembly that improves the accuracy and replication of a measurement. The indicator and marking assembly includes a mount that may be removably or integrally attached to a housing of the tape measure. The indicator and marking assembly further comprises a stop plate disposed on the mount. The stop plate comprises a main frame having a front wall oppositely situated to a back wall, wherein the back wall physically abuts the mount. A cutout is formed through the front and back walls of the stop plate to create a pair of oppositely situated flanges. The front walls of the flanges are coplanar with the front wall of the main frame of the stop plate.

The mount is positioned on the housing of the marking device such that a top side of the mount is adjacent to a front wall of the housing, wherein a tape blade of the measuring device extends through an aperture formed through the front wall and through an opening formed through a front wall of the mount. The flanges of the stop plate are arranged such that the tape blade extends between the flanges, and the flanges are directed towards the tape blade so that the flanges may assist in the reading of the measuring indicia on the tape blade. A front wall of the stop plate is contiguously formed with the front walls of the flanges, and is coplanar therewith.

The indicator and marking assembly further comprises a marker plate. The marker plate comprises a longitudinally extending body having centrally formed thereon and substantially perpendicularly extending therefrom a scribe, wherein the scribe is specially configured to mark an object. When not in use, the marker plate is in a recessed position, and fits within a bottom side of the mount so that the marker plate is flush with the bottom side of the mount, wherein the bottom side of the mount is directed towards a bottom wall of the housing of the tape measuring device. When in use, the marker plate is in an extended position such that the scribe is perpendicular to the bottom side of the mount.

The small size of the device allows a user to readily hold and manipulate the tape measure. A user can take accurate measurements in positions of poor visibility and awkward accessibility. A user can set precise measurements taken from other media or instructions, and lock such precise measurements in place on the tape measure. A user can easily transfer and mark such measurements onto another piece of work, and/or duplicate multiple pieces of work.

The present invention, when used, e.g., as an attachment to or part of a standard pocket tape measure, eliminates the problems of inaccurate human eyesight and memory, and eliminates the need to manipulate a separate marking tool, pen or pencil for recording, transferring and marking precise measurements. It solves the problems of poor accuracy, inefficiency, wasted time and material. The present measuring and marking device further facilitates precise measurement taking and reading for those persons who otherwise cannot read numbers readily, such as those suffering from dyslexia, weak eyesight, poor motor skills, etc.

The tape measuring device may further include a housing that is specially designed and configured to better withstand breakage and damage. This is largely a result of the formation of a plurality of cuts within the two side walls of the housing of the tape measuring device. The tape measuring device further reduces the changes of damages by placing an optional locking mechanism in a recessed position relative to the housing of the device. Furthermore, components of the marker plate are sized and dimensioned to be recessed relative to the housing of the tape measuring device, thereby minimizing their exposure to damage.

For a better understanding of the invention, its operating advantages and the specific objects attained by its uses, reference should be made to the accompanying drawings and descriptive matter in which there are illustrated preferred, but not exclusive, embodiments of the invention.

DETAILED DESCRIPTION OF THE INVENTION

The improved tape measuring device of the present invention comprises an indicator and marking assembly comprising a mount, a stop plate, and a marker plate. The mount is specially configured to be integrally formed with or easily attached to a standard tape measure including, for example, a standard size/shape of "pocket" or hand-held tape measure, thereby enhancing normal usage and function of the tape measure. Alternatively, the mount may be integrally formed with or easily attached to an exemplary housing for a tape measure as shall be described herein. Each of the stop plate and the marker plate is configured and positioned relative to one another on the mount to provide a reliable way of measuring, tracking, and replicating a measurement. More particularly, the stop element provides a means whereby a tape blade of the tape measuring device, may be stabilized temporarily without the necessity of implementing a locking mechanism such as is typically found in conventional tape measures; the stop plate also facilitates a precise reading of the tape blade's measuring indicia; and the scribe plate allows for the precise marking of an object so that a particular measurement may be replicated. The scribe plate is also particularly useful in that it may be easily retracted when not in use, thereby facilitating use of the tape measuring device.

The tape measuring device allows for quick and precise measuring, reading, recording, transferring and marking of measurements. The indicator and marking assembly may be assembled during the manufacturing process to form a single, integral piece, and the indicator and marking assembly is preferably designed so that it may be built-in or readily attached to any suitable tape measure, or to the housing disclosed herein, thereby forming a simple, convenient and unitary tool.

Once the measuring and marking device is manufactured with and/or fastened to any suitable tape measure, the resulting tape measure may be used in the normal fashion, such as, by securing an end hook of the tape blade at a start point of an object, and extending the tape blade across the object to a stop point. Should the stop point be, for example, an edge of the object, the stop plate of the measuring and marking device may be positioned such that the stop plate physically abuts the edge and thereby temporarily secures the tape measuring device to the object. Flanges located above the tape blade indicate the precise measurement from the end hook of the tape measure to the stop plate. Having obtained this measurement, a user may accurately replicate such first measurement by extending the tape blade until the flanges aligned with the measuring indicia on the tape blade are equal to the measurement. Such measurement may be locked in position by using a locking mechanism formed on the housing of the tape measuring.

The marker plate may be used to mark or score an object at a particular measurement point. Once the desired measurement has been located on the tape measure using the indicator member, such as described above, for example, a scribe may be used to precisely mark and score the object at a desired position on the object by applying pressure while swinging the housing of the tape measuring device from side to side or back and forth against the surface to be marked. The scribe may comprise anything from a ridge, ledge, rim, knob, protrusion(s), lip, overhang, etc. Nevertheless, in an exemplary embodiment, the scribe member comprises a portion being generally pointed, wherein such pointed dimension permits indentation of a mark onto a surface. However, other shapes are also envisioned.

In order to ensure the precise read, recordation, replication, and marking of a measurement, certain key portions of the stop plate and the marker are coplanar with one another, wherein such key portions will become apparent after a reading of the present disclosure.

The tape measuring device further may be designed to allow for the replacement of the tape blade. Such functionality allows for the replacement of a tape blade when, e.g., the tape blade is damaged, worn, etc., without the need to replace the entire tape measuring device.

There has thus been outlined, rather broadly, the more important features of the invention in order that the detailed description thereof that follows may be better understood, and in order that the present contribution to the art may be better appreciated. Any additional features of the invention will be described hereinafter and may form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. Rather, the invention is capable of other embodiments and of being practiced and carried out in various ways. Also, it is to be understood that the phraseology and terminology employed herein are for the purpose of description and should not be regarded as limiting.

Referring to the Figures, an exemplary tape measuring device 10 comprises a housing 12. Although housing 12 is depicted as having a generally rounded configuration, many different shapes and styles of tape measure housings are known in the prior art and may be configured for use with the present invention. Nevertheless, exemplary housing 12 has opposed side walls 14, 16, a top wall 18, a bottom wall 20, a rear wall 22, and a front wall 24, wherein these walls define an enclosure (not shown) for holding a wound tape blade 13. Tape blade 13 may be an elongated blade formed of a ribbon of metal or composite material coiled on a spooling means, such as a spool, with a retraction means, such as a spring mechanism. Such types of coiled blade with spring tape measures are common in the prior art.

In an exemplary embodiment, each of side walls 14 and 16 respectively has a plurality of cuts 26 and 28 formed therein, wherein the cuts are radially disposed around a central axis of side walls 14 and 16. The cuts are positioned and configured to increase the strength of housing 12.

Tape measuring device 10 further comprises an optional locking mechanism 30. Locking mechanism 30 serves to lock the tape blade in position when the tape blade is withdrawn from housing 12. Although locking mechanism 30 may operate in a manner and by a means which are conventionally known, a lock engaging member 32 of lock mechanism 30, which provides a means whereby lock mechanism 30 may be activated or deactivated, is disposed within top side 14 and front wall 24 of housing 12 and is preferably recessed relative thereto to thereby reduce the likelihood of damage to lock engaging member 32 should tape measuring device 10, e.g., be dropped or otherwise put in a compromising situation.

Tape measuring device 10 further comprises an indicator and marking assembly 40. Assembly 40 comprises a mount 42 having a top side 44 oppositely situated to a bottom side 46, a front wall 48, and a proximal side wall 50 oppositely situated to a distal side wall 52. Mount 42 is joined to housing 12 such that bottom side 46 is joined to bottom wall 20 of housing 12, proximal side wall 50 is joined to side wall 14 of housing 12, distal side wall 52 is joined to side wall 16 of housing 12, and front wall 48 is immediately adjacent to front wall 24 of housing 12.

Figure 10:
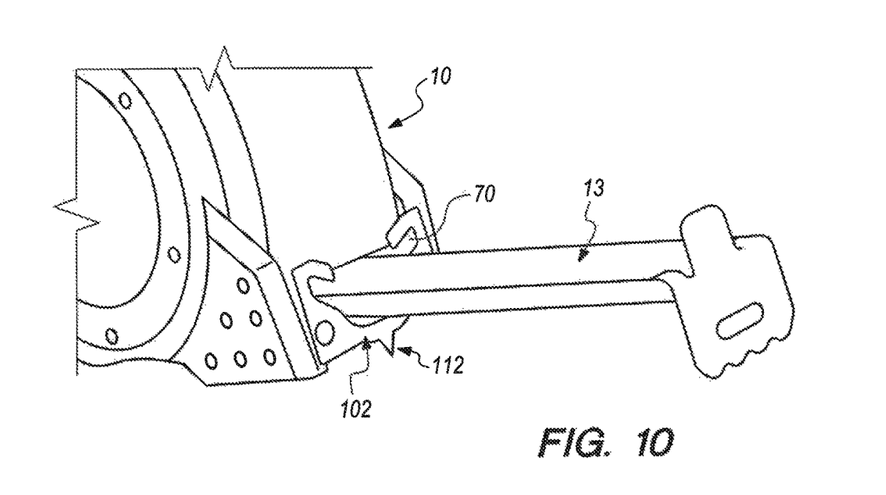
FIG. 10 is a schematic depicting the tape measuring device of FIG. 1, wherein an exemplary tape blade is extended, and marker plate is in an extended position.
Figure 11:
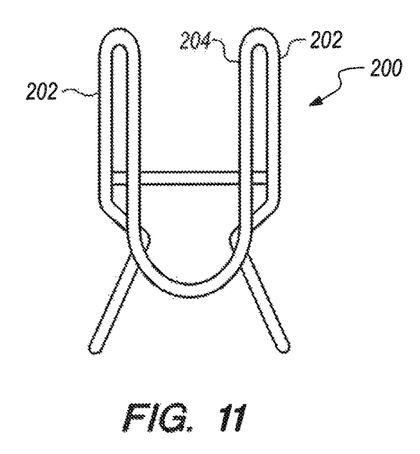
FIGS. 11 and 12 are schematics depicting an exemplary clip.
Figure 12:
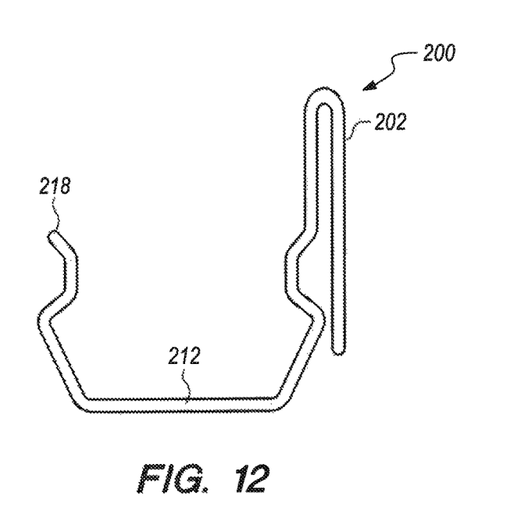
Figure 13:
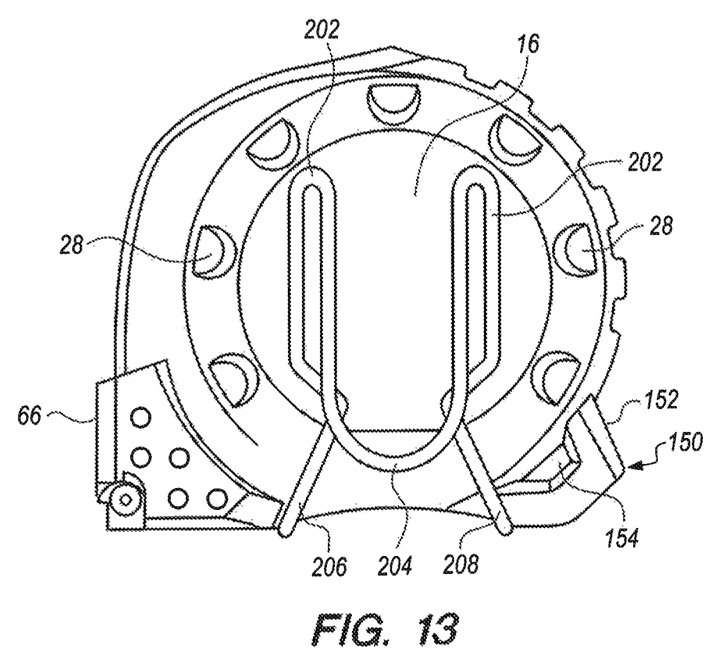
FIGS. 13-17 are schematics depicting an exemplary engagement of the clip depicted in FIGS. 11 and 12 with the tape measuring device depicted in FIG. 1.
Figure 14:
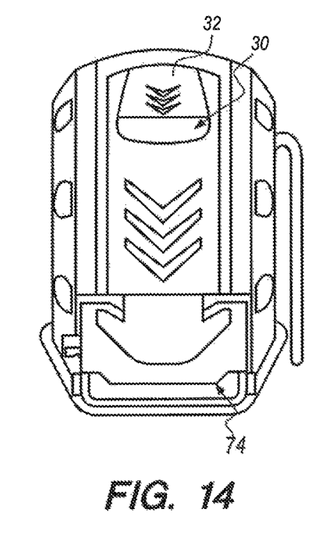
Figure 15:
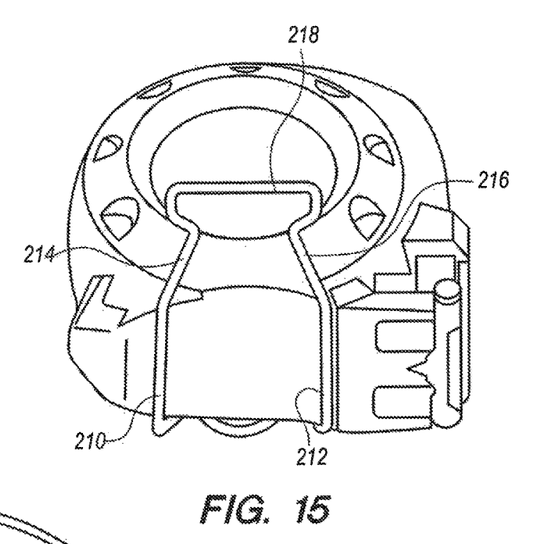
Figure 16:
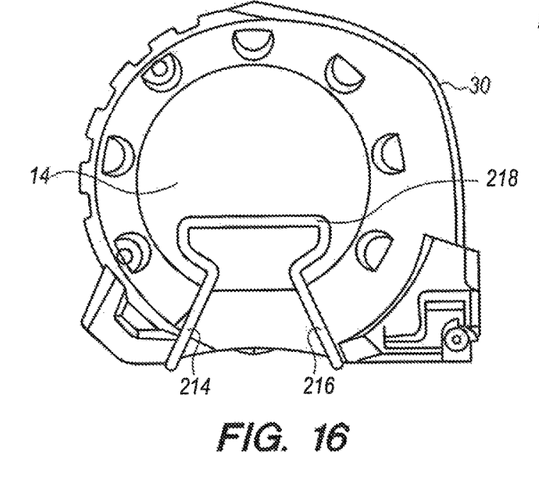
Figure 17:
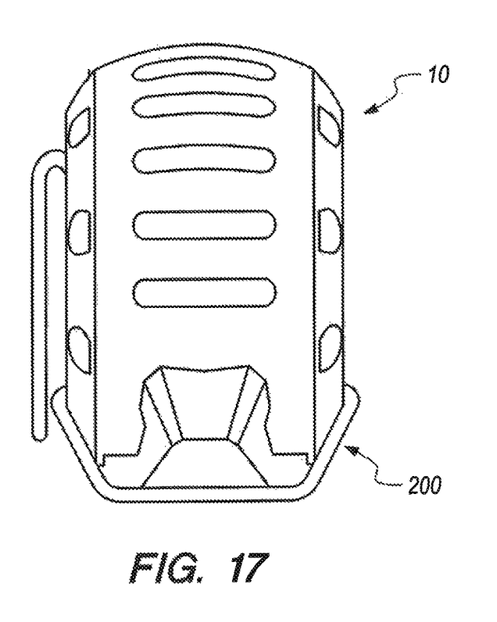

As best show in FIG. 10, a tape blade opening 70 is formed through front wall 48 of mount 42 and is in fluid communication with the spooling means. Tape blade opening 70 provides a passageway for the extension and retraction of tape blade 13.

Each of proximal and distal side walls 50 and 52 of mount 42 has a respective pocket 54 and 56 formed therein. Catch members 58 and 60 respectively are disposed within pockets 54 and 56 and respectively are attached thereto such that catch members 58 and 60 are movable in an up and down fashion, i.e., in a direction towards and away from top side 44. Each of pockets 54 and 56 has a hole (not shown) formed therethrough for purposes of receiving a respective knob 62 and 64. A plate 66 may be fitted over proximal side wall 50 to conceal catch member 58, and a plate 68 may be fitted over distal side wall 52 to conceal catch member 60.

Figure 1:
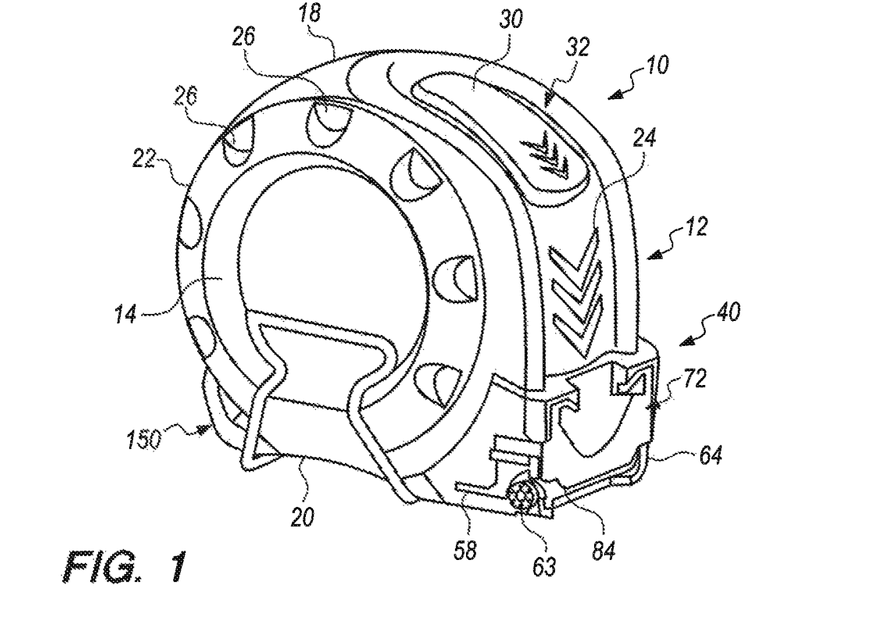
FIG. 1 is a schematic depicting an exemplary tape measuring device.
Figure 2:
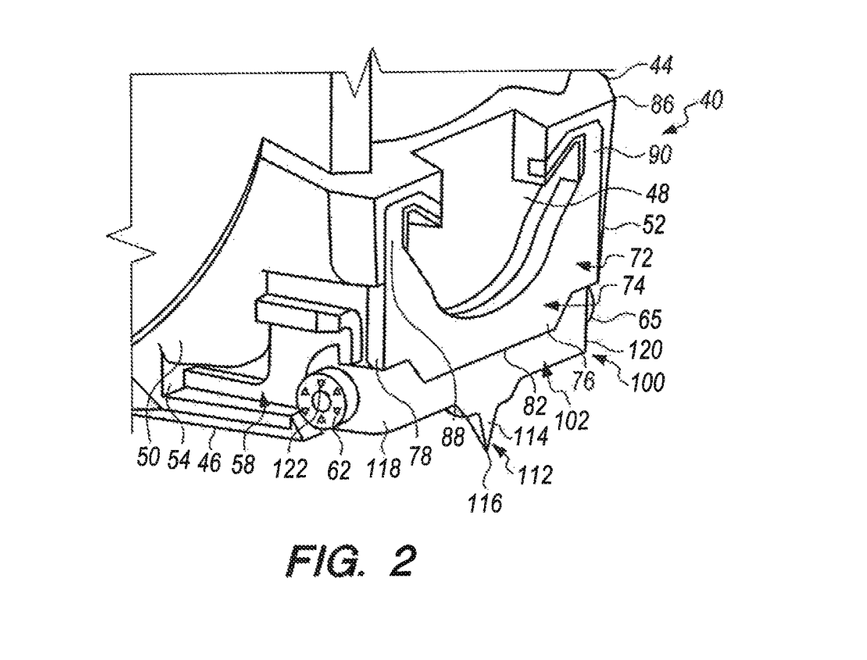
FIG. 2 is a schematic depicting a close-up view of an exemplary indicator and marking assembly engaged with an exemplary housing of the tape measuring device depicted in FIG. 1.

Referring primarily to FIG. 2, assembly 40 has a stop plate 72. Stop plate 72 comprises a longitudinally extending main frame 74 having a front wall 76 oppositely situated to a rear wall (not shown), wherein the rear wall of stop plate 72 is disposed on mount 42 such that front wall 76 is flush with top side 44 of mount 42. Stop plate 72 further comprises a proximal lateral wall 78 which is perpendicularly formed with front wall 76 and which is disposed within pocket 54 of mount 42; and an oppositely situated distal lateral wall 80 which is perpendicularly formed with front wall 76 and which is disposed within pocket 56 of mount 42. Longitudinally extending main frame 74 of stop plate 72 has a bottom side 82 which is perpendicularly and contiguously formed with proximal and distal lateral walls 78 and 80 and with front wall 76 and rear wall of main frame 74. Bottom side 82 is directed towards bottom side 46 of mount 42 and a lower abutment portion 84 of front wall 48 of mount 42 is located between bottom side 82 and bottom side 46, wherein lower abutment portion 84 is recessed relative to front wall 76 of main frame 74 of stop plate 72.

Stop plate 72 further comprises a top side 86 oppositely situated to bottom side 82, wherein top side 86 is coplanar with top side 44 of mount 42. A cutout is centrally formed through top side 86 and extends through a central portion of front wall 76 and the rear wall of main frame 74 to thereby expose front wall 48 of mount 42, wherein front wall 48 is recessed relative to front wall 76 of stop plate 72. The cutout is configured to create a proximal flange member 88 and a distal flame member 90 on stop plate 72, wherein proximal and distal flange members 88 and 90 are directed towards tape blade opening 70 and opposite to one another. Proximal and distal flange members 88 and 90 provide a means whereby the measuring indicia located on the tape blade may be highlighted. That is, when the tape blade is extended from tape blade opening 70 to take a measurement, proximal and distal flange members 88 and 90 directly overly the measuring indicia located on tape blade 13 for such measurement, thereby assisting a user in reading the measurement.

Referring to the Figures, assembly 40 further comprises a marker plate 100. Marker plate 100 comprises a longitudinally extending body 102 having a forward face 104 oppositely situated to a rearward face 106, and a top side 108 oppositely situated to a bottom side 110. Centrally formed with and extending substantially perpendicularly from bottom side 110 is a scribe or protrusion 112 having a substantially pyramidal configuration which terminates at a tip 116, wherein tip 116 is capable of placing a mark on an object. A forward face 114 of scribe 112 is coplanar with forward face 104 of body 102.

Marker plate 100 further comprises a proximal lateral wall 118 contiguously joined with and substantially perpendicularly formed with body 102 at one end thereof, and a distal lateral wall 120 contiguously joined with and substantially perpendicularly formed with body 102 at an opposite end thereof. As will be discussed below, a flange 122 of proximal lateral wall 118 is configured to be received within a cutout 59 formed within catch member 58 when marker plate 100 is in an extended position, while a flange 124 of distal lateral wall 120 is configured to be received within a cutout 61 formed within catch member 60 when marker plate 100 is in an extended position. Each of proximal and distal lateral walls 118 and 120 has a respective hole (not shown) formed therethrough which are respectively aligned with the holes formed in pockets 54 and 56, and which, in combination with the holes formed in pockets 54 and 56, receive knobs 62 and 64.

Referring to the Figures, marker plate 100 is attached to mount 42 by inserting shafts (not shown) of knobs 64 and 64 respectively through the holes formed through proximal and distal lateral walls 118 and 120 of marker plate 100 and the holes formed in pockets 54 and 56. A head 63 of knob 62 is directed towards an outer surface of proximal lateral wall 118 and a head 65 of knob 64 is directed towards an outer surface of distal lateral wall 120. As discussed in greater detail below, once so mounted, flanges 122 and 124 of marker plate 100 may be operably engaged with respective catch members 58 and 60.

Figure 3:
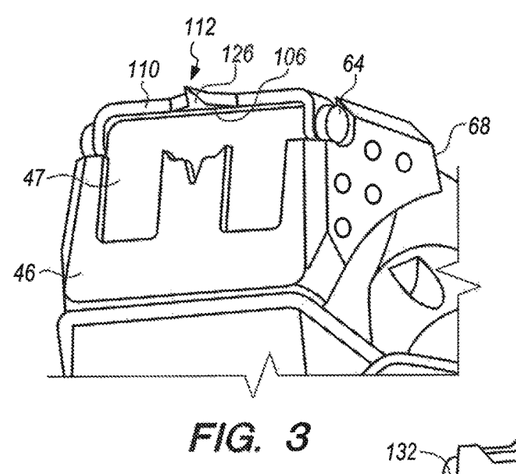
FIG. 3 is a schematic depicting an exemplary bottom side of the tape measuring device engaged with an exemplary marker plate, wherein the marker plate is in an extended position.
Figure 4:
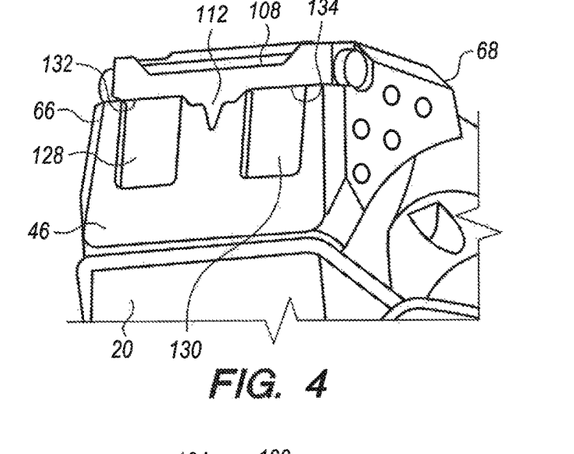
FIGS. 4 and 5 are schematics depicting the bottom side of the tape measuring device engaged with the marker plate both of FIG. 3, wherein the marker plate is in a retracted position.
Figure 5:
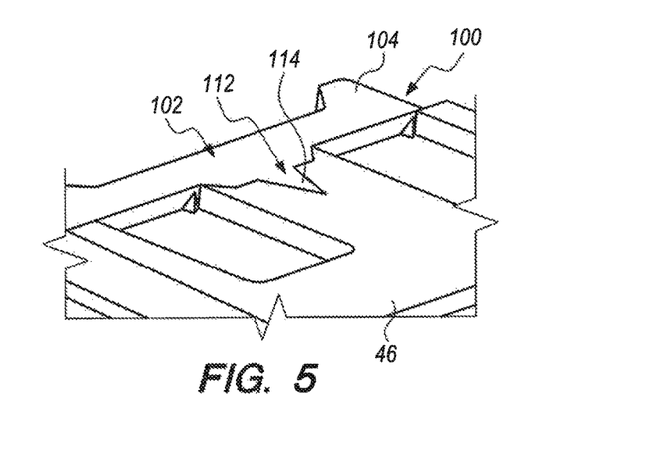
Figure 6:
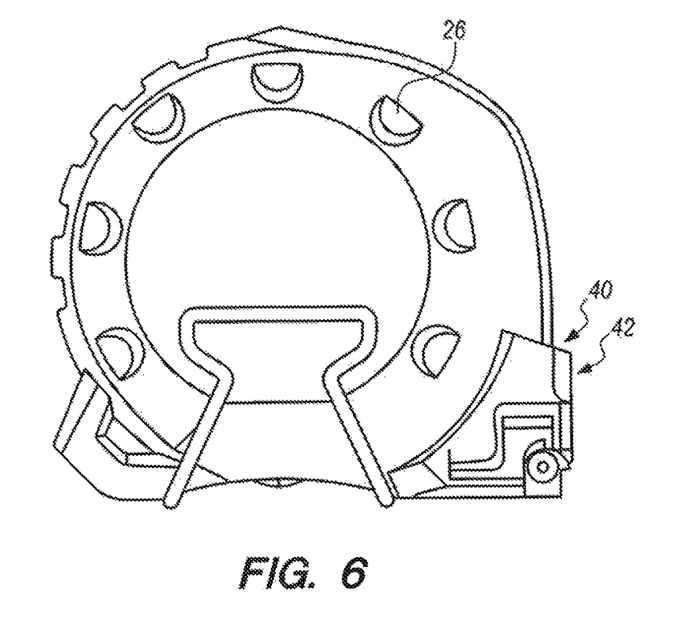
FIG. 6 is a schematic depicting the tape measuring device of FIG. 1, wherein the marker plate is in a retracted position.

Referring particularly to FIGS. 3-5, when marker plate 100 is properly applied to mount 42, and when scribe 112 is not needed, i.e., when a user does not wish to mark an object, scribe 112 is in a retracted position. In this retracted position, rearward face 106 of marker plate 100 physically abuts bottom side 46 of mount 42. In an exemplary embodiment, bottom side 46 of mount 42 is specially configured to receive scribe 112 of marker plate 100. To that end, bottom side 46 has a recessed wall 47 having a substantially M-shaped configuration formed therein. When retracted, rearward face 106 of body 102 of marker plate 100 and a rearward face 126 of scribe 112 rest against recessed wall 47 such that forward face 104 of body 102 and forward face 114 of scribe 112 are flush with bottom side 46 of mount 42, and such that a well 128 and a well 130 are formed, wherein wells 128 and 130 are respectively defined at an uppermost region thereof by an indents 132 and 134.

When it is desired to mark an object, scribe 112 may be extended, i.e., tip 116 of scribe may be made substantially perpendicular to bottom side 46 of mount 42. This may be accomplished by, for example, exerting a force substantially perpendicular to bottom side 110 of body 102 of marker plate 100 at indents 132 and 134. Such force may be generated by a user's finger(s). This force moves catch members 58 and 60 in a downward direction, i.e., towards bottom side 46 of mount 42, and thereby causes causes flanges 122 and 124 to be received within respective openings 59 and 61 of catch members 58 and 60. In this extended position, marker plate 100 is in a locked position, and forward faces 104 and 114 of marker plate 100 and scribe 112 are flush with front wall 76 of stop plate 72, thereby facilitating the taking of an accurate measurement. Additionally, rearward face 106 of body 102 of marker plate 100 physically abuts lower abutment portion 84 of mount 42, and top side 108 of body 102 is aligned with and flush with front wall 76 of main frame 74 of stop plate 72. A downward directed force may be applied to top wall 18 of housing 12, thereby causing tip 116 of scribe 112 to be driven into an underlying object, and to thereby leave a mark in the object so pierced by tip 116.

When it is desired to retract scribe 112, a force may be applied substantially perpendicularly to forward face 104 of body 102. Such force may be generated by a user's finger(s) pushing directly against forward face 104. This force causes flanges 122 and 124 to respectively push against catch members 58 and 60, thereby causing catch members 58 and 60 to move in an upward direction, i.e., towards top side 44 of mount 42. Flanges 122 and 124 are thereby released from respective openings 59 and 61 of catch members 58 and 60, and scribe 112 is pivoted towards bottom side 46 of mount 42 until rearward face 106 of body 102 and rearward face 126 of scribe 112 physically abut recessed wall 47. In this position, forward faces 104 and 114 are flush with bottom side 46.

In an exemplary application of tape measuring device 10, an object may be measured by placing an end hook which forms a terminal end of the tape blade against an edge of the object. The tape blade may be extended from housing 12 until front wall 76 of stop plate 72 abuts another edge of the object. Proximal and distal flange members 88 and 90 facilitate reading of the measurement as flange members 88 and 90 are in direct alignment with the resulting measurement indicium.

Replication of the resulting measurement may be achieved by extending the tape blade to the previously measured length by aligning proximal and distal flange members 88 and 90 with the previously determined measuring indicia. Such extended tape blade may be positioned on the object and a marking point may be disposed against the object by retracting marking plate 100 as described above. Housing 12 may then be moved in a side to side fashion and/or a back and forth motion such that tip 116 of scribe 112 marks and/or scores the object. As scribe 112, flanges 88 and 90, and front wall 76 of stop plate are coplanar, the replication of the measurement is as exact and precise as possible.

Figure 7:
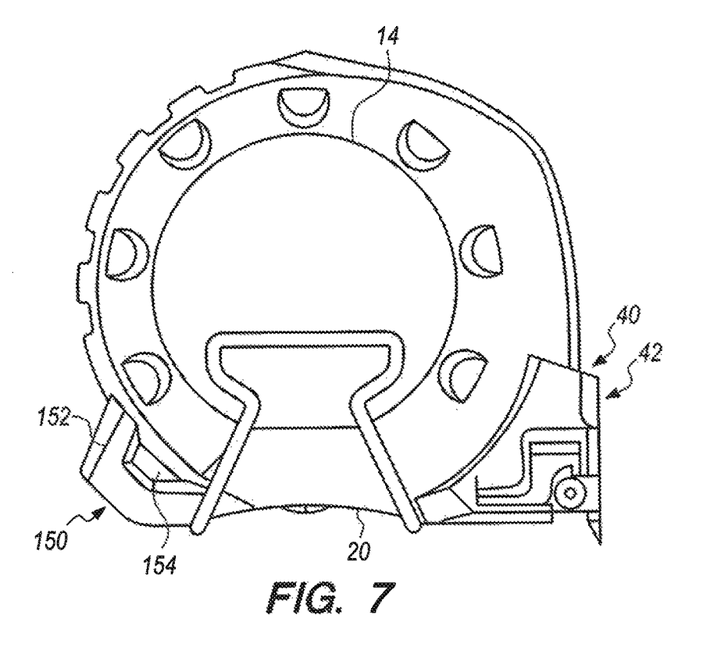
FIG. 7 is a schematic depicting the tape measuring device of FIG. 1, wherein the marker plate is in an extended position.
Figure 8:
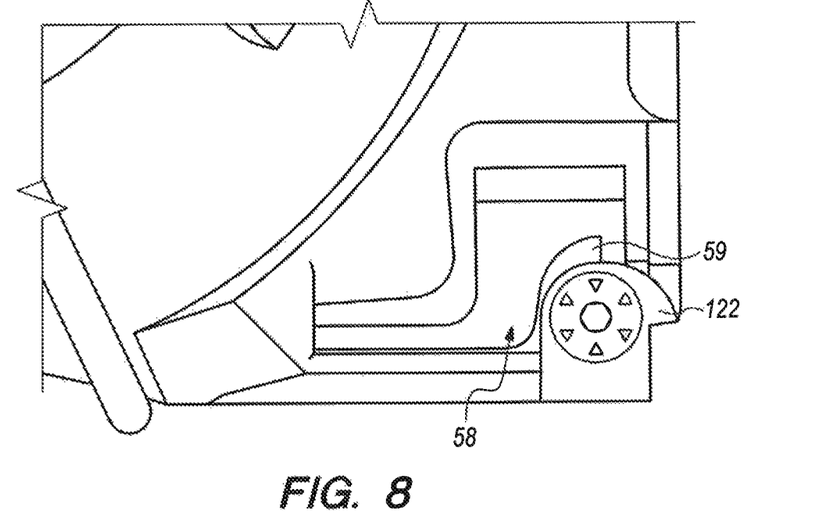
FIG. 8 is a schematic depicting a close-up view of an exemplary catch member and an exemplary flange member of the marker plate when the marker plate is in a retracted position.
Figure 9:
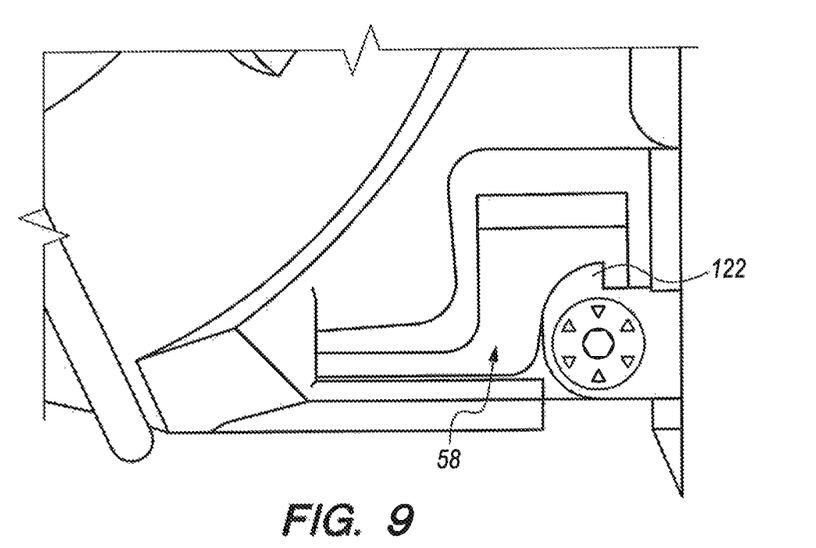
FIG. 9 is a schematic depicting the catch member and the flange member, both depicted in FIG. 8, when the marker plate is in an extended position.

As shown, e.g., in FIG. 7, tape measuring device 10 further comprises a grip member 150. Grip member 150 comprises a generally annular shaped body 152 having an aperture 154 formed therethrough. Body 152 is contiguously formed with side wall 14 and bottom wall 20 of housing 12.

As is readily apparent from a reading of the present disclosure, the specially designed mount, stop plate, and marker plate disclosed herein are designed to function as a mounted accessory to a standard tape measure or to a tape measure housing also as disclosed herein. Once attached in position on the tape measure, all the parts and elements function as one unitary device. The device provides the user with a hand-held instrument for precise and easy sighting, locking, recording, transferring and marking of measurements. Persons who cannot readily take, read or remember measurements, due to impaired vision or visibility, poor lighting or awkward positioning can easily use the invention to achieve precise and reliable results.

Tape measuring device 10 further comprises a specially configured clip which may be used to secure the tape measuring device to a wide variety of materials, including, for example, to the belt, pocket, pants, etc. of a user to thereby provide ready access to the tape measuring device. The clip is light and elegant with a simple design. Unlike traditional clips, it is not integrally formed with the housing of the tape measuring device, and it, therefore, can be readily attached and detached. The clip is also symmetrical, so that the housing of the tape measuring device can be placed into the clip in any direction and can be worn on either the right or left side of the user's body while letting the tape measuring device face either forward or backward. The clip is strong, but also pliable so that the tape measuring device can be removed forcefully in many different directions without causing damage and enabling ease of use so that the user does not need to worry about how they remove the tape measuring device from the clip.

Referring to FIGS. 11-17, in an exemplary embodiment, clip 200 is formed from a single wire formed of a wide variety of materials including, for example, at least one of a metal, an alloy, plastic, a rubber, and the like. As shown in the figures, clip 200 comprises a pair of vertically extending loops 202 sandwiching a generally U-shaped region 204. The loops from pair 202 respectively flow into substantially linearly extending portions 206 and 208. Each of portions 206 and 208 slope away from respective loops 202 and portion 206 is non-parallel to portion 208. Portions 206 and 208 turn at about a 90 degree angle to respectively form transverse sections 210 and 212, wherein sections 210 and 212 are parallel to one another. Transverse sections 210 and 212 turn towards pair of loops 202 to form respectively lateral support segments 214 and 216, wherein lateral support segments 214 and 216 slope towards each other. Lateral support segments 214 and 216 then turn away from each other and then turn towards each other where they converge at a bridge member 218.

In an exemplary embodiment, clip 200 is attached to tape measuring device 10 such that pair of loops 202 physically abut side wall 16 of housing 12, transverse sections 210 and 212 physically abut grip member 200 and bottom wall 20 of housing 12, and lateral support segments 214 and 216 and bridge member 218 physically abut side wall 14 of housing 12. Clip 200 may be attached to a belt, for example, by disposing the belt between substantially U-shaped member and pair of loops 202.

Figure 18:
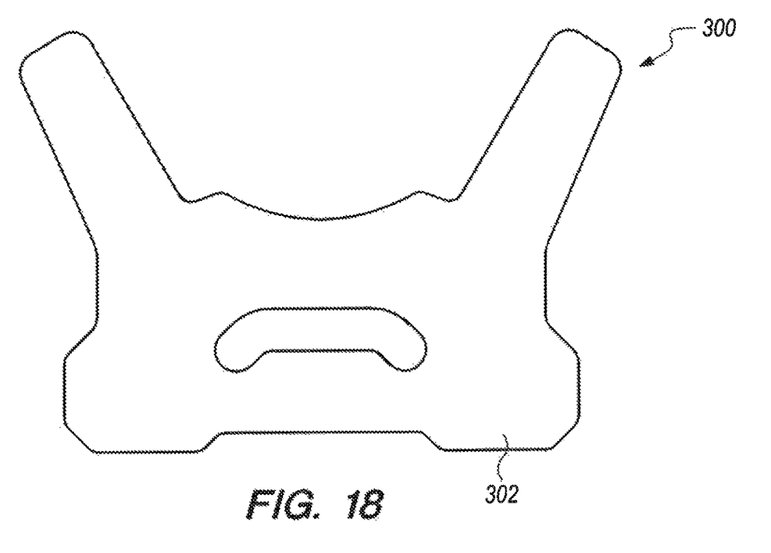
FIG. 18 is a schematic depicting an exemplary end hook.

The invention is further directed to an improved end hook. As shown in FIG. 18, an exemplary end hook 300 that may be incorporated into tape measuring device 10 comprises a texturized surface 302. The texturizing agent used to form surface 302 preferably comprises a pure steel grit. In an exemplary embodiment, end hook 300 is formed by dipping a plate into a bath of a non-water soluble resin adhesive. The dipped plate may then be sand blasted with the pure steel grit. End hook 300 strengthens the grip of tape blade, thereby, facilitating the taking of a measurement of an object.

With respect to the above description, it is to be realized that the optimum dimensional relationships for the parts of the invention, to include variations in size, materials, shape, form, function and manner of operation, assembly and use, are deemed readily apparent and obvious to one skilled in the an, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

While there is shown and described certain preferred embodiments of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

What is claimed is:

1. A tape measuring device, comprising:
   a housing comprising a body that surrounds an enclosure which holds a tape blade, and further wherein the body of the housing has an aperture formed therethrough;
   a mount having a top side oppositely situated to a bottom side, a front wall oppositely situated to a rear wall, and a proximal side wall oppositely situated to a distal side wall, wherein an opening is formed through the front and rear walls, and further wherein the mount is attached to the housing such that the opening of the mount is aligned with the aperture of the housing such that the tape blade extends through the opening and the aperture when the tape blade is extended from the enclosure;
   a stop plate comprising a first flange opposed to a second flange, wherein each of the first and the second flanges respectively comprises a top side oppositely situated to a bottom side, wherein the bottom sides of the first and second flanges are disposed on the front wall of the mount, and further wherein the opening of the mount is positioned between the first and second flanges, and further wherein the first and second flanges are directed towards the opening; and
   a marker plate secured to the mount, wherein the marker plate pivotally moves relative to the mount, and wherein the marker plate comprises a body comprising a forward face oppositely situated to a rearward face, wherein the rearward face is directed towards the mount, and wherein the body of the marker plate further comprises a top side oppositely situated to a bottom side, wherein a protrusion extends from the bottom side of the marker plate in a direction opposed to the top side of the body of the marker plate, and further wherein, when the marker plate is in an extended position, the forward faces of the marker plate and the protrusion are coplanar with the top sides of the first and second flanges of the stop plate, and when the marker plate is in a retracted position, the rearward face of the marker plate physically abuts the bottom side of the mount and further wherein, when the tape blade is extended, the first and second flanges overly a measuring indicia located on the tape blade.

2. The indicator and marking assembly of claim 1, wherein the bottom side of the mount has a recessed wall formed therein, and further wherein, wherein the marker plate is in a retracted position, the rearward face of the marker plate rests on the recessed wall of the bottom side of the mount such that the forward face of the marker plate is flush with the bottom side of the mount.

3. An indicator and marking assembly, wherein the assembly comprises:
   a mount having a top side oppositely situated to a bottom side, a front wall oppositely situated to a rear wall, and a proximal side wall oppositely situated to a distal side wall, wherein the proximal side wall comprises a proximal pocket and the distal side wall comprises a distal pocket, and further wherein an opening is formed through the front and rear walls;
   a proximal catch member disposed within the proximal pocket of the mount and a distal catch member disposed in the distal pocket of the mount, wherein the proximal and distal catch members respectively comprise a proximal cutout and a distal cutout formed therein, and further wherein the proximal and distal catch members are slidably engaged with respective proximal and distal pockets;
   a stop plate comprising a first flange opposed to a second flange, wherein each of the first and the second flanges respectively comprises a top side oppositely situated to a bottom side, wherein the bottom sides of the first and second flanges are directed towards the front wall of the mount, and further wherein the opening of the mount is positioned between the first and second flanges, and further wherein the first and second flanges are directed towards the opening; and
   a marker plate, wherein the marker plate pivotally moves relative to the mount, and wherein the marker plate comprises:
      a body comprising:
         a forward face oppositely situated to a rearward face, wherein the rearward face is directed towards the mount;
         a top side oppositely situated to a bottom side, wherein a protrusion having a forward face extends from the bottom side of the body of the marker plate in a direction opposed to the top side of the body of the marker plate; and
      a proximal lateral wall oppositely situated to a distal lateral wall, wherein the proximal lateral and distal lateral walls substantially perpendicularly extend from the body of the marker plate, and wherein the proximal and distal lateral walls respectively terminate in a proximal flange member and a distal flange member;
   wherein, when the marker plate is in an extended position, the proximal and distal flange members of the respective proximal and distal lateral walls of the marker plate are engaged respectively with the proximal and distal cutouts of the proximal and distal catch members and the forward face of the marker plate and the forward face of the protrusion are coplanar with the top sides of the first and second flanges of the stop plate, and further wherein the proximal and distal flange members respectively exert a force against proximal and distal catch members, thereby causing proximal and distal catch members to move towards the top side of the mount thereby allowing for the rotation of the body of the marker plate towards the bottom side of the mount to thereby cause the marker plate to be in a retracted position such that the protrusion of the marker plate is directed towards the rear wall of the mount.

4. An indicator and marking assembly, wherein the assembly comprises:
   a mount having a top side oppositely situated to a bottom side, a front wall oppositely situated to a rear wall, and a proximal side wall oppositely situated to a distal side wall, wherein the proximal side wall comprises a proximal pocket and the distal side wall comprises a distal pocket, and further wherein an opening is formed through the front and rear walls;
   a proximal catch member disposed within the proximal pocket of the mount and a distal catch member disposed in the distal pocket of the mount, wherein the proximal and distal catch members respectively comprise a proximal cutout and a distal cutout formed therein, and further wherein the proximal and distal catch members are slidably engaged with respective proximal and distal pockets; and a marker plate, wherein the marker plate pivotally moves relative to the mount, and wherein the marker plate comprises:
   a body comprising:
      a forward face oppositely situated to a rearward face, wherein the rearward face is directed towards the mount;
      a top side oppositely situated to a bottom side, wherein a protrusion having a forward face extends from the bottom side of the body of the marker plate in a direction opposed to the top side of the body of the marker plate; and
   a proximal lateral wall oppositely situated to a distal lateral wall, wherein the proximal lateral and distal lateral walls substantially perpendicularly extend from the body of the marker plate, and wherein the proximal and distal lateral walls respectively terminate in a proximal flange member and a distal flange member;

wherein, when the marker plate is in an extended position, the proximal and distal flange members of the respective proximal and distal lateral walls of the marker plate are engaged respectively with the proximal and distal cutouts of the proximal and distal catch members, and further wherein the proximal and distal flange members respectively exert a force against proximal and distal catch members, thereby causing proximal and distal catch members to move towards the top side of the mount thereby allowing for the rotation of the body of the marker plate towards the bottom side of the mount to thereby cause the marker plate to be in a retracted position such that the protrusion of the marker plate is directed towards the rear wall of the mount.

\* \* \* \* \*